(12) United States Patent
Ajbani et al.

(10) Patent No.: US 7,459,497 B2
(45) Date of Patent: Dec. 2, 2008

(54) POLYMERIC COMPOSITION FOR SEALS AND GASKETS

(75) Inventors: Manoj Ajbani, Copley, OH (US); Christopher Kiehl, Akron, OH (US); Thierry Florent Edme Materne, Lasne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/012,811

(22) Filed: Feb. 6, 2008

(65) Prior Publication Data

US 2008/0132647 A1 Jun. 5, 2008

Related U.S. Application Data

(62) Division of application No. 11/052,703, filed on Feb. 7, 2005, now Pat. No. 7,351,762.

(60) Provisional application No. 60/544,504, filed on Feb. 13, 2004.

(51) Int. Cl.
*C08L 2/00* (2006.01)
(52) U.S. Cl. ............ 524/474; 525/88; 525/92; 525/99; 525/240; 424/492; 424/521; 424/522
(58) Field of Classification Search ........... 524/474; 525/88, 92, 99, 240; 428/492, 521, 522
See application file for complete search history.

(56) References Cited

U.S. PATENT DOCUMENTS

| | | | |
|---|---|---|---|
| 4,197,377 A | 4/1980 | Bohm et al. | 525/99 |
| 4,250,273 A | 2/1981 | Bohm et al. | 525/99 |
| 4,927,882 A | 5/1990 | Bayan | 525/99 |
| 5,362,787 A | 11/1994 | Ngoc et al. | 524/297 |
| 5,380,785 A | 1/1995 | Ngoc et al. | 524/504 |
| 5,415,940 A | 5/1995 | Ngoc et al. | 428/424.4 |
| 5,462,993 A | 10/1995 | Ngoc et al. | 525/274 |
| 5,927,029 A | 7/1999 | Ngoc | 525/204.5 |
| 7,015,284 B2 | 3/2006 | Ajbani et al. | 525/88 |
| 7,351,762 B2 * | 4/2008 | Ajbani et al. | 524/474 |

FOREIGN PATENT DOCUMENTS

| | | |
|---|---|---|
| EP | 0 930 337 A | 7/1999 |
| EP | 1 031 608 | 8/2000 |
| GB | 9214969.9 | 7/1992 |

* cited by examiner

*Primary Examiner*—Robert D. Harlan
(74) *Attorney, Agent, or Firm*—Alvin T. Rockhill

(57) ABSTRACT

The present invention relates to a polymeric composition which has an excellent combination of properties for use in making seals and gaskets for utilization in appliances, automotive applications, and building applications, such as window glazing gaskets. These polymeric compositions offer excellent dimensional stability, low compression set, outstanding sealing characteristics, low temperature flexibility, heat resistance and ultra-violet light resistance. The present invention more specifically discloses a polymeric composition having excellent characteristics for utilization in manufacturing seals and gaskets including dimensional stability, low compression set and outstanding sealing characteristics, said polymeric composition being comprised of a blend of (A) a thermoplastic resin selected from the group consisting of polypropylene, polyethylene, poly phenylene ether, polystyrene, and styrene containing copolymer resins, (B) an elastomeric polymer selected from the group consisting of block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, and a crosslinked olefinic elastomer, (C) a high molecular weight crosslinked diene elastomer comprised of repeat units that are derived from conjugated diene monomer selected from the group consisting of 1,3-butadiene and isoprene, wherein the high molecular weight diene elastomer has a weight average molecular weight of at least about 200,000, and (D) an oil.

17 Claims, No Drawings

POLYMERIC COMPOSITION FOR SEALS AND GASKETS

This application is a divisional of U.S. patent application Ser. No. 11/052,703, filed on Feb. 7, 2005, now U.S. Pat. No. 7,351,762 which claims the benefit of U.S. Provisional Patent Application Ser. No. 60/544,504, filed on Feb. 13, 2004. The teachings of U.S. patent application Ser. No. 11/052,703 and U.S. Provisional Patent Application Ser. No. 60/544,504 are incorporated herein by reference their entirety.

BACKGROUND OF THE INVENTION

Seals for utilization in appliances (such as, refrigerators, freezers, and ice makers), automotive body applications (such as, windows, hoods, trunks and doors), and building applications (such as window glazing gaskets and weather strips) should be dimensional stable, provide low compression set and offer outstanding sealing characteristics over a broad temperature range. In many applications it is important for the seals to be capable of sealing out noise, wind and water, while providing long-term ultraviolet light resistance. At the same time, the material used in the seal must offer the degree of flexibility required for the particular application. Window and door weather stripping for automobiles and trucks is a high volume application for such seals. However, seals offering essentially the same characteristics are also needed for sun roof seals, handle gaskets, window spacers, window guides, lock seals, windshield wiper pivot seals and in building applications such as window glazing gaskets and weather seals. Gaskets utilized in plumbing applications and appliances must also be capable of forming a liquid/gas tight seal and low compression set.

Rubbery blends of polyvinyl chloride (PVC) with a nitrile rubber (NBR) have sometimes been used in seals for automotive body applications. The nitrile rubber is included in such blends as a permanent modifier for the PVC which provides it with a higher degree of flexibility. However, the utilization of standard nitrile rubber in such blends typically results in only moderate compression set characteristics. It is very important for seals to have good compression set characteristics in most applications. For instance, improved resistance to water leaks and wind noise can be attained by utilizing a seal which has low compression set characteristics.

It is known from the teachings of United Kingdom Patent Application No. 9214969.9 that low compression set characteristics can be improved by utilizing a technique known as "dynamic vulcanization" via free radical generators, such as azo compounds or organic peroxides. However, this "dynamic vulcanization" technique suffers from the weakness that the azo compounds or organic peroxides required reduce the thermal stability of the polyvinylchloride resin and the ultraviolet light resistance of the nitrile rubber. There is also an increased risk of early crosslinking during processing which leads to scorching and reduced recyclability.

U.S. Pat. No. 5,362,787 discloses a highly crosslinked nitrile rubber which can be easily blended with PVC to make compositions which have an excellent combination of properties for use in making seals and gaskets for automotive and building applications. The PVC blends made with such highly crosslinked nitrile rubbers offer excellent dispersion behavior, dimensional stability, low compression set, outstanding sealing characteristics, and low temperature flexibility.

U.S. Pat. No. 5,362,787 more specifically discloses a highly crosslinked nitrile rubber composition which can be blended with polyvinyl chloride to make compositions having excellent characteristics for seals and gaskets including dimensional stability, low compression set, outstanding sealing characteristics and good low temperature flexibility, said highly crosslinked nitrile rubber composition being comprised of (1) a highly crosslinked nitrile rubber having repeat units which are derived from (a) 1,3-butadiene, (b) acrylonitrile and (c) a crosslinking agent, wherein said highly crosslinked nitrile rubber has a Mooney viscosity of about 50 to about 120, a swelling index of less than about 10 percent, a mill shrinkage of less than 10 percent, and a gel content of greater than 90 percent; and (2) from about 1 to about 30 phr of a plasticizer.

U.S. Pat. Nos. 5,380,785, 5,415,940 and 5,462,993 disclose a rubbery polymer which can be blended with polyvinyl chloride to make leathery compositions having good heat and ultraviolet light resistance, said rubbery polymer being comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a half ester maleate soap and (f) a crosslinking agent.

U.S. Pat. No. 5,927,029 discloses a polymeric composition having excellent characteristics for seals and gaskets including dimensional stability, low compression set and outstanding sealing characteristics, said polymeric composition being comprised of a vulcanized blend of (1) a rubbery polymer which is comprised of repeat units which are derived from (a) butyl acrylate, (b) at least one member selected from the group consisting of methyl methacrylate, ethyl methacrylate, methyl acrylate, and ethyl acrylate, (c) acrylonitrile, (d) styrene, and (e) a crosslinking agent; (2) a thermoplastic styrene/ethylene-butylene/styrene resin; and (3) at least one glycol component selected from the group consisting of ethylene glycol and triethylene glycol.

SUMMARY OF THE INVENTION

The present invention relates to a polymeric composition which has an excellent combination of properties for use in making seals and gaskets for utilization in appliances, automotive applications, and building applications, such as window glazing gaskets. These polymeric compositions offer excellent dimensional stability, low compression set, outstanding sealing characteristics, low temperature flexibility, heat resistance and ultra-violet light resistance.

The present invention more specifically discloses a polymeric composition having excellent characteristics for utilization in manufacturing seals and gaskets including dimensional stability, low compression set and outstanding sealing characteristics, said polymeric composition being comprised of a blend of (A) a thermoplastic resin selected from the group consisting of polypropylene, polyethylene, poly phenylene ether, polystyrene, and styrene containing copolymer resins, (B) an elastomeric polymer selected from the group consisting of block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, and a crosslinked olefinic elastomer, (C) a high molecular weight crosslinked diene elastomer comprised of repeat units that are derived from conjugated diene monomer selected from the group consisting of 1,3-butadiene and isoprene, wherein the high molecular weight diene elastomer has a weight average molecular weight of at least about 200,000, and (D) an oil.

The present invention further reveals a process for making a polymeric composition having excellent characteristics for seals and gaskets including dimensional stability, low compression set and outstanding sealing characteristics, said process comprising dynamically vulcanizing a blend of (A) a thermoplastic resin selected from the group consisting of polypropylene, polyethylene, poly phenylene ether, polystyrene, and styrene containing copolymer resins, (B) an elastomeric polymer selected from the group consisting of block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, and a crosslinked olefinic elastomer, (C) a high molecular weight crosslinked diene elastomer comprised of repeat units that are derived from conjugated diene monomer selected from the group consisting of 1,3-butadiene and isoprene, wherein the high molecular weight diene elastomer has a weight average molecular weight of at least about 200,000, and (D) an oil.

The present invention also discloses a gasket which is comprised of a dynamically vulcanized blend of (A) a thermoplastic resin selected from the group consisting of polypropylene, polyethylene, poly phenylene ether, polystyrene, and styrene containing copolymer resins, (B) an elastomeric polymer selected from the group consisting of block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, and a crosslinked olefinic elastomer, (C) a high molecular weight crosslinked diene elastomer comprised of repeat units that are derived from conjugated diene monomer selected from the group consisting of 1,3-butadiene and isoprene, wherein the high molecular weight diene elastomer has a weight average molecular weight of at least about 200,000, and (D) an oil.

DETAILED DESCRIPTION OF THE INVENTION

The thermoplastic resin is normally a polyolefin resin or polystyrene. The polyolefin resin can be polyethylene, isotactic polypropylene, syndiotactic polypropylene, polypropylene impact copolymers containing about 1-7 percent by weight of ethylene, butene, hexene, or octene, polyolefin copolymers such as ethylene-butene, hexene, or octene, polybutene, reactor grade modified polypropylene, oxypolyolefin, or metallocene polypropylene. Syndiotactic polypropylene resins may also be used. Isotactic polypropylene copolymers with ethylene, butene or hexene that are prepared with traditional Ziegler-Natta catalyst are highly preferred.

A reactor grade impact modified polypropylene can also be used. A publication article in Modern Plastics Encyclopedia/89, mid October 1988 Issue, Volume 65, Number 11, pages 86-92, describes several types of polypropylenes, which is incorporated herein as a reference for the types of polypropylenes that may be used in the blends of the said invention. Metallocene based polypropylene resins that may be produced by single-site technology can also generally be used. The polypropylene produced by methods described in "Metocene™, Precise Tailoring of Polypropylene Resins Using Single-Site Technology, David Fischer, Presented at the SPE Automotive TPO Global Conference 2001, Hyatt Regency, Dearborn, Mich., Oct. 1-3, 2001, can also normally be used. The teachings of this reference are incorporated herein by reference.

Reactor grade thermoplastic olefins (TPOs) as produced by Basell Polyolefins and as described in TPE 2003 Conference Proceedings, RAPRA Technology Limited, Brussels, Belgium, Sep. 16-17, 2003, page 73 may also be used as a resin when a lower modulus and low hardness soft grip is desired. The reactor grade polypropylene that contains olefin rubber molecules as described in TPE TPOCON 2003, SPE Topical Conference Proceedings, Sep. 22-24, 2003, Paper Titled "A New Reactor Ethylene-Propylene Plastomer with Increased Flexibility and Lower Stiffness", Todd Glogovsky, Basell may also be used in this invention and is incorporated herein as a reference. A linear low-density polyethylene resin may also be used for lower shore A hardness TPE compounds.

Syndiotactic polypropylenes that are described in U.S. Pat. Nos. 5,476,914 and 5,334,677 may be used in preparing the thermoplastic elastomer compositions. The teachings of U.S. Pat. Nos. 5,476,914 and 5,334,677 are incorporated herein by reference. The syndiotactic polypropylenes used may be homopolymers or copolymers. The syndiotactic polypropylenes utilized in the present invention comprise at least 15 percent syndiotactic molecules, more preferably at least 50 percent syndiotactic molecules, and most preferably at least 82% syndiotactic molecules. Syndiotactic homopolymers or copolymers with ethylene may be used. For instance, commercial syndiotactic polypropylenes, such as those sold by Atofina may be used. The syndiotactic polypropylene used will preferably have a melt flow rate greater than 0.5 g/10 minutes at 230° C./2.16 kg load as determined by ASTM D 1238, more preferably between 10 and 110 g/10 minutes.

A reactor grade impact modified polypropylene can also be used. A publication article in Modern Plastics Encyclopedia/89, mid October 1988 Issue, Volume 65, Number 11, pages 86-92, describes several types of polypropylenes, which is incorporated herein as a reference for the types of polypropylenes that may be used in the blends of the said invention. Metallocene based polypropylene resins that may be produced by single-site technology can also generally be used. The polypropylene produced by methods described in "Metocene™, Precise Tailoring of Polypropylene Resins Using Single-Site Technology, David Fischer, Presented at the SPE Automotive TPO Global Conference 2001, Hyatt Regency, Dearborn, Mich., Oct. 1-3, 2001, can also normally be used. The teachings of this reference are incorporated herein by reference.

Reactor grade thermoplastic olefins (TPOs) as produced by Basell Polyolefins and as described in TPE 2003 Conference Proceedings, RAPRA Technology Limited, Brussels, Belgium, Sep. 16-17, 2003, page 73 may also be used as a thermoplastic resin, and teachings of which are incorporated herein as a reference.

The thermoplastic resins that are useful in the present invention also include polyphenylene ether (PPE) resins (also known within the art as "Polyphenylene Oxide), styrene containing copolymer resins such as styrene-acrylonitrile resins (SAN), acrylonitrile-butadiene resins (ABS), and the functionalized versions of PPE and styrene containing resins that contain one functional group selected from the group consisting of maleic anhydride, hydroxyls, amines, epoxides, and glycidyl methacrylates.

The functional groups are particularly useful for compatibilizing the thermoplastic resins with the saturated block copolymers and the diene containing elastomers by virtue of reactive grafting of the functional groups present on the said thermoplastic resins with the functional groups present on the saturated block copolymers and the diene containing elastomers.

Polyphenylene ether resins that are most useful in this invention include but are not limited to poly(2,6-dimethyl-1,4-phenylene ether), poly(2,6-dimethyl-co-2,3,6-trimethyl-1,4-phenylene ether), poly(2,3,6-trimethyl-1,4-phenylene ether), poly(2,6-diethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dilauryl-1,4-phenylene ether), poly(2,6-dephenyl-1,4-phenylene ether), poly(2,6-dimethoxy-1,4 phenylene ether), poly(1,6-diethoxy-1,4-phenylene ether), poly(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenyl-1,4-phenylene ether), poly(2-ethoxy-1,4-phenylene ether), poly(2-chloro-1,4-phenylene ether), poly(2,6-dibromo-1,4-phenylene ether), and poly(3-bromo-2,6-dimethyl-1,4-phenylene ether), their respective homopolymers or copolymers.

Block copolymers consisting of at least two polymeric blocks (A) composed mainly of a vinyl aromatic compound and at least one polymeric rubbery block (B) composed mainly of hydrogenated compounds or units that are obtained by the hydrogenation of conjugated diene compound, are to be used in this invention. It is preferred that in the block copolymer, a minimum number of two blocks are present, one composed of a vinyl aromatic compound or units such as styrene that provides stiffness or reinforcement, and another that is composed mainly of hydrogenated compounds or units that are obtained by the substantial hydrogenation of the conjugated diene compound or units, and provides elasticity. It is highly preferred that the block copolymer is a triblock copolymer with two end blocks of a vinyl aromatic compound and a rubbery mid block of substantial number of hydrogenated compounds or units. Block copolymers with partially hydrogenated mid-blocks may also be used and may contain a combination of hydrogenated compounds or units and their pre-cursor diene compounds or units. The block copolymers that may be used in this invention are selected from the group of styrene-ethylene, butylenes-styrene (SEBS), styrene-ethylene,propylene-styrene (SEPS), hydrogenated styrene-isoprene copolymer, styrene-ethylene propylene (SEP) block copolymer, styrene-ethylene, ethylene propylene-styrene (SEEPS) and hydrogenated styrene-butadiene copolymer. Hydrogenated products that are copolymers or homopolymers of isoprene and butadiene-containing monomer units may also be used. The hydrogenation of random diene copolymers are described by authors E. W. Duck, J. R. Hawkins, and J. M. Locke, in Journal of the IRI, 6, 19, 1972, which may be used as the highly saturated elastomer in this invention and is incorporated herein as a reference. The saturated triblock polymers, SEBS and SEPS, with styrene end blocks are also used in this invention as the saturated elastomers. SEBS and SEPS are obtained on the hydrogenation of triblock copolymers of styrene and butadiene or styrene and isoprene and are known to be commercially available. Some commercial available examples of such elastomers include Kraton® G series polymers. U.S. Pat. Nos. 3,686,364 and 3,865,776 give some examples of block copolymers that may be used in the practice of this invention and are incorporated herein by reference. It is highly preferred that the highly saturated elastomer to be SEBS having a bound styrene content that is within the range of 15 weight percent to about 40 weight percent.

It is possible to use the saturated block copolymers that are modified versions of SEBS. Such modified block copolymers additionally have a substantial number of styrene units that are randomly distributed in the rubber midblocks of ethylene and butylene. These modified saturated block copolymers are supplied under Kraton® 'A' series. Saturated block copolymers grades as mentioned in TPE 2003 RAPRA Conference Proceedings, Brussels, Belgium, Sep. 16-17, 2003, Paper 18, Page 157, and Paper 21, page 181 may also be used and are incorporated herein by reference.

Hydrogenated diblock elastomers of styrene and butadiene or styrene and isoprene can also be used as the block copolymers or saturated block copolymers even though triblock elastomers are highly preferred. The block copolymers as used in this invention will be substantially saturated or hydrogenated. It is preferred that at least 75 percent of the original double bonds of the isoprene and/or butadiene units that are present in the block copolymers prior to the hydrogenation have been saturated by the hydrogenation process, more preferably at least 90 percent and most preferably at least 95 percent of the original double bonds have been saturated. Block copolymers that are partially hydrogenated may also be used, even though highly hydrogenated or saturated block copolymers are highly preferred.

The block copolymers that are useful in this invention are generally described in Chapter 11, Thermoplastic Elastomers, $2^{nd}$ Edition, Hanser Publishers, 1996, which is incorporated herein by reference.

The block copolymer will preferably be of a high molecular weight, with the weight average molecular weight greater than 200,000 grams/mole, more preferably greater than 275,000 grams/mole, and most preferably that is greater than 375,000 grams/mole. The block copolymer will preferably be oil extended with about 15 to about 600 parts of oil of the said block copolymer. It is also possible to add the oil in part or full during the thermo-mechanical mixing and the dynamic vulcanization of the said crosslinkable elastomer. The oil will preferably be a paraffinic, napthenic or polybutene. The triblock copolymer may be obtained by the hydrogenation of the diene units or compounds that have a higher vinyl content of no less than 30% of the said diene units or compounds. The thermoplastic resin will typically be present at a level which is within the range of about 5 parts by weight to 60 parts by weight, the elastomeric polymer will typically be present at a level which is within the range of 5 parts by weight to about 90 parts by weight, the high molecular weight crosslinked diene elastomer will typically be present at a level which is within the range of about 5 parts by weight to about 90 parts by weight, and the oil will typically be present at a level which is within the range of about 15 parts by weight to about 600 parts by weight.

In this specification, the term vulcanization or crosslinking or curing can be used interchangeably and indicate that the molecules of a polymer are linked together or are linked with the molecules of another polymer.

In this specification, the term elastomer and rubber are used interchangeably. The term thermoplastic elastomer refers to a polymeric material that has elastomer like properties and has thermoplastic processability and recyclability.

For purposes herein, the term elastomer and rubber indicate that the polymeric material exhibits a combination of high elongation or extensibility, high retractability to its original shape or dimensions after removal of the stress or load, with little or no plastic deformation and possesses low modulus and requires a low load to stretch the material. The term thermoplastic resin means a material having thermoplastic processability and has a high modulus and stiffness. Thermoplastic resins do not exhibit a combination of high elongation or extensibility, and are not retractable to their original shape or dimensions particularly when stretched and released beyond their yield point. High loads are required to stretch thermoplastic resins. Rubber elasticity is defined in Chapter 3 of L. R. G. Treloar, Introduction to Polymer Science (Wyneham Publications (London) Ltd. 1974), the teachings of which are incorporated herein by reference.

In this specification, the diene containing crosslinked elastomer is an elastomer that is comprised of repeat units that are derived from conjugated diene monomers selected from the group consisting of 1,3-butadiene and isoprene, and the elastomer has been crosslinked during the thermomechanical mixing step.

In this specification, the crosslinked olefin elastomer is an elastomer that is comprised of olefin units, and has been crosslinked during the thermomechanical step. The crosslinked olefin elastomer will have olefinic segments and will not have blocks that are derived from a vinyl aromatic monomer. The crosslinked olefin elastomer may be a copolymer prepared by the copolymerization of olefins and a diene containing monomer, particularly a non-conjugated diene monomer, and the weight percent of the diene in the olefin elastomer will be less than about 15% by weight of the said elastomer.

The crosslinking of the olefin and diene containing elastomer will be carried-out during the thermo-mechanical mixing step and in the presence of a thermoplastic resin. The crosslinking of the olefin and diene elastomer may be carried-out either separately or simultaneously.

The diene elastomer will be of a high weight average molecular weight. The weight average molecular weight will preferably be greater than about 200,000 g/mole, and more preferably be greater than and about 275,000 g/mole, and most preferably be greater than and about 350,000 g/mole. It is very important for the diene elastomer to have a high weight average molecular weight.

The crosslinked diene elastomer polymerized by solution polymerization techniques can be a diene elastomer that is made with polymerization in a solvent such as hexane or cyclohexane. Such elastomers are well known to those skilled in this art. U.S. Pat. Nos. 6,566,478, 6,313,216, 6,372,863, 6,293,325, 6,289,959, 6,140,434, 5,844,044, 5,679,751, 5,677,402, 5,448,003, 5,239,009 and 5,272,220 generally describe such elastomers and methods for their synthesis. The teachings of these United States patents are incorporated herein by reference with respect to their description of such elastomers and their synthesis. The elastomers used will be substantially random. Solution elastomers such as synthetic-polyisoprene may also be used. The solution elastomers used may be styrene-butadiene random copolymer or styrene-isoprene random copolymer with about 10 to about 40% by weight of bound styrene content. The Mooney viscosity of the said solution elastomer may be in the range of about 15 to about 120 Mooney as measured per ML 1+4 at 100° C. The styrene butadiene rubber will preferably have a vinyl content which is within the range of about 10 to 80%.

The solution diene rubbers that are particularly more useful in this invention for use as crosslinkable elastomers are the modified or coupled elastomers such as copolymers of styrene and diene selected from butadiene and isoprene and the living polymer, before terminating the polymerization, modified with tin or silicon. Such modified elastomers may also be for example styrene/butadiene copolymers and styrene/isoprene/butadiene ter-polymers. Homopolymers of diene may also be employed, but it is more preferred to have the styrene be present as a co-monomer. Copolymers of Isoprene and butadiene may also be used.

The dynamically crosslinked diene elastomer may be comprised of monomer units that are derived from 1,3-butadiene and isoprene, and a vinyl aromatic monomer, wherein the monomer units are essentially distributed in a random manner.

An important characteristics of the diene coupled elastomer, particularly the tin-modified elastomers, is that a substantial portion, preferably at least 40%, and more generally in the range of about 60 to about 85% of the tin (Sn) bonds or silicon (Si) bonds are bonded to the diene units of the styrene/diene copolymer, which may be referred herein as tin-dienyl or silicon-dienyl bond, for example butadienyl bonds in case of butadiene terminating with the tin (or silicon).

A copolymer-coupled elastomer may be prepared by copolymerization of styrene with 1,3-butadiene and/or isoprene in an organic solution with an alkyl lithium catalyst. A co-catalyst or catalyst modifier may also be used. Such polymerization methods are well known to those skilled in this art. After formation of the copolymer elastomer, but while the catalyst is still active and, therefore, while the copolymer is still considered a living or live polymer that is capable of further polymerization, the polymerization can be terminated by reacting the live polymer with a tin or silicon compound such as tin tetrachloride. This taking into account that the valence of tin is four, typically the modified copolymer is considered coupled or capped, with an accompanying molecular weight or viscosity jump or increase, and the modified copolymer being in what is sometimes called as a star shaped, or star configured, coupled elastomer.

Coupling compounds similar to tin tetrachloride with a lower or higher valence may also be used to obtain an architecture that is higher or lower in the average number of arms that are obtained from a tin tetrachloride that has a valence of four. A tin coupled copolymer elastomer can also be obtained via coupling with an organo tin compound such as for example alkyl tin chloride, dialkyl tin chloride, and trialkyl tin chloride, resulting in variations in the tin coupled polymer with the tin chloride yielding simply a tin terminated copolymer.

A coupled styrene/isoprene/butadiene terpolymer. Some examples of preparation of such coupled elastomers is further given in following Journal Articles: "Solution-Polymerized Rubbers with Superior Breakdown Properties" Journal of Applied Polymer Science Vol. 14, PP 1421-1432 (1970), "Tin Coupled SBRs: Relationship between Coupling Type and Properties, Paper No 78, Presented at $148^{th}$ Meeting of the Rubber Division, American Chemical Society, Cleveland, Ohio, Oct. 17-20, 1995, and "Newly Developed Solution SBRs for Low Rolling Resistance Tire", RCT 1990 V 63 # 1, P 8-22, which are incorporated herein as a reference.

Some examples of modified or coupled solution elastomers such as tin or silicon-coupled, with several variations are given in U.S. Pat. Nos. 6,090,880, 5,064,910, 4,553,578, 4,444,236, 5,362,794, 5,677,399, 5,786,441, 6,008,295, 6,252,007, and 6,228,908, which are incorporated herein as a reference, as they may also be used in thermoplastic elastomers as disclosed in this invention.

It may also be preferred to use the random copolymers of styrene, butadiene, and isoprene or copolymers of isoprene and butadiene that are prepared with solution polymerization techniques. Such rubbery and unsaturated copolymers may be highly branched with varying vinyl content from about 5 to about 80 percent. The copolymers may be coupled with Sn (SiCl4) or Si (SiCl4) coupling and may have multiple arms or branches.

The crosslinked diene elastomer can also be a nitrite rubber or its hydrogenated version (hydrogenated nitrile rubber), and the acrylonitrile content may vary from about 5 to about 60% by weight of the said elastomer and may be as high to allow the polymer to exhibit an elastomer like extensibility and retractability. The nitrite rubber may be substantially or partially hydrogenated. The diene units in the nitrile rubber may be hydrogenated from about 40% to about 98% by weight. Such hydrogenated elastomers are commercially available from Zeon Chemicals. It may be necessary to use a compatibilizer to compatibilize the polar nitrite or hydrogenated nitrile rubber with the relatively non-polar block copolymer. The compatibilizer may consist of a combination of polar and non-polar segments. It is preferred that the compatibilizer is elastomeric in nature so that it has high extensibility and retractability. A polyamide-block-ether elastomer may be used to compatibilize the nitrile rubber or its hydrogenated derivative with the block copolymer.

The diene elastomer may be a functionalized elastomer that has functional groups that are grafted or copolymerized on the elastomer and the said functional groups are selected from the group consisting of epoxide, carboxylic acid or anhydride, glycidyl methacrylate, hydroxyl, and amine. The functionalized elastomer is particularly useful for compatibilizing the more polar thermoplastic resins with the relatively non-polar block copolymers.

Crosslinked diene elastomer may also be prepared by emulsion polymerization techniques wherein the polymerization is carried out in an aqueous medium. However, the diene elastomers synthesized by solution polymerization techniques are highly preferred.

Olefin elastomer useful to prepare thermoplastic elastomers according to the invention include monoolefin copolymer rubbers comprising non-polar, rubbery copolymers of two or more monoolefins (EPR rubber), preferably copolymerized with at least one polyene, usually a diene (EPDM rubber). EPDM is a polymer of ethylene, propylene and one or more non-conjugated diene(s), and the monomer components may be polymerized using Ziegler-Natta or metallocene catalyzed reactions, among others. Typically an EPDM rubber has from about 0.5 to about 6 or 10 weight percent of a diene (based on the weight of the polymer) and has a molar ratio of repeat units from ethylene to propylene of from 25:75 to 75:25. Satisfactory non-conjugated dienes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB) and the like, or a combination thereof.

U.S. Pat. No. 6,150,464 lists the types of EPDM elastomers and the hydrosilation crosslinking agents that may be used in this invention, and is incorporated herein as a reference. It was reported in U.S. Pat. No. 6,150,464 in that rubber having a structure in which the diene monomer has carbon-carbon multiple bonds which are predominantly unencumbered, i.e. bonds which are sterically unhindered such as terminal or pendant double bonds, provide a greatly improved rate of cure in the hydrosilylation curing process of the invention.

The use of saturated olefinic rubber in which the diene component is selected from the group consisting of 5-ethylidene-2-norbornene, 5-methyl-1,4-hexadiene, 1,4-hexadiene and 5-vinyl-2-norbornene is preferred. A structure from 5-vinyl-2-norbornene is particularly preferred as a diene component of such rubber. Highly branched forms of olefinic elastomers may also be used.

Olefin elastomers that are used to prepare thermoplastic vulcanizates are also described in U.S. Pat. Nos. 5,750,625 and 4,130,535 which are incorporated herein by reference for the type of olefinic elastomers and their crosslinking technologies that may be used in this invention to crosslink the elastomers.

The thermoplastic elastomer blend composition useful for the preparation of the sealing article. will comprise of a processing oil. Examples of such oils that can be used include Paralux™ process oils 701R, 1001R, 2401R, 6001R, from Chevron and the like. It is preferred to use an oil with a high flash point for better retention of the oil. Naphthenic oils are preferred with for use in blends having a relatively high styrene content and paraffinic oils are preferred for utilization in conjunction with blends having a relatively low styrene content.

U.S. Pat. Nos. 6,251,998, 6,169,145, 6,150,464, 6,147,160, 6,084,031, 5,672,660, 5,936,028, and 4,803,244 teach the methods and hydrosilation crosslinking systems for dynamic vulcanization of the diene elastomers and/or olefin elastomer in presence of a hard and non-rubbery thermoplastic resin, and are incorporated herein as a reference. The thermoplastic elastomer containing a diene containing crosslinkable elastomer will preferably be crosslinked with a hydrosilation or hydrosilylation system wherein the hydrosilation catalyst is selected from the group consisting of a platinum, platinum zero compounds complexed with compounds selected from carbon monoxide, fumarates, phosphines, divinyltetramethyldisiloxanes, tetravinyldimethyldisiloxanes, palladium, chloroplatinic acid, platinum chloride complexes in alcohols, and rhodium, that is complexed with a member selected from polyvinyltetramethyldisiloxanes or cyclovinylmethylsiloxanes wherein additional divinylsiloxanes or polyvinylmethylcyclosiloxanes are present, wherein the catalyst or catalyst complexed compounds are incorporated on the block copolymer, crosslinkable elastomer, and/or oil, and are preferably present from about 0.0015 to about 1 parts metal catalyst by weight of the crosslinkable elastomer. The hydrosilation agent will most preferably be tetrakis (dimethylhydrogensiloxy)silane or tetrakis(dimethylsiloxy)silane. The hydrosilation catalyst will most preferably be a platinum zero compound that is complexed with carbon monoxide and polyvinylmethylcyclicsiloxanes to give a platinum carbonyl complex in cyclic methylvinylsiloxanes.

The preparation of the thermoplastic elastomer (also called as TPE) composition may be carried out in a continuous mixer, or a combination of a continuous mixer and a batch mixer. When a batch mixer is used, the discharged and uncrosslinked blend may be fed through a single screw-extruder and pelletized. When a continuous mixer is used, the blend may be pelletized after discharging from the twin-screw extruder. The dynamic vulcanization of the unsaturated diene elastomer or rubbery polymer or elastomer will be preferably carried out in a continuous mixer such as a twin-screw extruder or a Farrel continuous mixer. After the preparation of the thermoplastic elastomer composition, the elastomer may be extruded, thermoformed, or injection molded to form the sealing article.

The seal can be a weatherseal as described in U.S. Pat. No. 6,368,700 or 4,616,445, the teachings of which are incorporated herein by reference. The seal can also be in the form of a gasket having an O-ring design meeting the specifications provided by ASTM Designation F477-99 or D3212-96a. The thermoplastic elastomer blend can also be used in manufacturing adjustable entrance seals as described in U.S. Pat. No. 5,704,656, the teachings of which are incorporated herein by reference. The thermoplastic elastomer blends of this invention can also be used as a replacement for cork and can be used as a sealing material in synthetic closures, such as a stopper for wine bottles.

The thermoplastic elastomer blend composition may also contain reinforcement or fillers selected from the group consisting of talc, clay, calcium carbonate, silica, carbon black, and wollastonite. The thermoplastic elastomer blends may also contain antiozonants and oxidants that are known to a rubber chemist of ordinary skill. The antiozonants may be physical protectants such as waxy materials that come to the surface and protect the part from oxygen or ozone or they may chemical protectors. The chemical protectors may be selected from the class of styrenated phenols, butylated octylated phenol, butylated di(dimethylbenzyl)phenol, p-phenylenediamines, butylated reaction products of p-cresol and Dicyclopentadiene (DCPD, polyphenolic antioxidants, hydroquinone derivatives, quinoline, diphenylene antioxidants and thioester antioxidants and the like and their blends. Some representative trade names of suitable products include Wingstay® S antioxidant, Wingstay® T antioxidant, Polystay® C antioxidant, Polystay® 100 antioxidant, Polystay® 100 AZ antioxidant, Polystay® 200 antioxidant, Wingstay® L antioxidant, Wingstay® LHLS antioxidant, Polystay® K antioxidant, Polystay® 29 antioxidant, and Wingstay® SN-1. The antioxidants and antiozonants used will preferably be non-staining and non-migratory. For applications that require non-black pigmentation or compositions where the natural color may be desired, carbon black may not be used and above mentioned antioxidants and antiozonant may be used instead. It is important that the said elastomer contains a significant portion of the antioxidant and antiozonant and/or carbon black (whenever used) in the said blends.

The uncoupled solution polymerized diene elastomers used in blends with the highly saturated and olefin elastomers will have a vinyl content between 10 and 70 percent by weight, more particularly between 20 and 55 percent by weight. The uncoupled solution elastomers may be further comprised of a vinyl aromatic monomer selected from the group consisting of styrene and alpha-methylstyrene with the bound content of the vinyl aromatic monomer in the range of about 10 to about 50 percent by weight.

For providing additional stability against UV radiation, hindered amine light stabilizers (HALS) and UV absorbers may be also used in the thermoplastic elastomer composition. A skilled person is aware of such stabilizers. For example, Tinuvin® RTM 123, 144, 622, 765, 770 and 780, and Chemisorb® TTM-944 and the like may be employed. These kinds of UV stabilizers are available from Ciba Specialty Chemicals and Cytex Industries.

When the diene and/or olefin elastomer is fully or partially cured in the thermoplastic elastomer compositions, curatives of the known art may be employed. The curing may be accomplished by dynamic vulcanization, wherein the rubber phase is generally crosslinked simultaneously as it is being mixed with the thermoplastic resin. The curatives may be selected from sulfur based, peroxide based, or phenolic based curatives. U.S. Pat. Nos. 3,758,643, 3,806,558, 5,051,478, 4,104,210, 4,130,535, 4,202,801, 4,271,049, 4,340,684, 4,250,273, 4,927,882, 4,311,628 and 5,248,729 teach the type of curing or crosslinking agents and methods that can be utilized and the teaching of these references are incorporated herein by reference.

When sulfur based curing agents are employed for curing the diene containing solution elastomer, accelerators and cure activators may be used. Accelerators are used to control the time and/or temperature required for dynamic vulcanization and to improve the properties of the thermoplastic composition. In one embodiment, a single accelerator system may be used, i.e., primary accelerator. The primary accelerator(s) may be used in total amounts ranging from about 0.5 to about 4, preferably about 0.8 to about 1.5 phr (parts by weight per hundred parts by weight of rubber). In another embodiment, combinations of a primary and a secondary accelerator might be used with the secondary accelerator being used in smaller amounts, such as from about 0.05 to about 3 phr, in order to activate and to improve the properties of the thermoplastic elastomer composition. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and zinc oxide (ZnO) may also be used. When peroxide based curing agents are used, co-activators or coagents that are known to a rubber chemist of ordinary skill may be used in combination with the peroxides. These coagents may include trimethylolpropane triacrylate (TMPTA), trimethylolpropane trimethacrylate (TMPTMA), triallyl cyanurate (TAC), triallyl isocyanurate (TAIC), and the like. The peroxide crosslinkers and the coagents that may be employed for partial or complete dynamic vulcanization can be selected from the journal publication, "Peroxide Vulcanization of Elastomer", Vol. 74, No 3, July-August 2001, the teachings of which are incorporated here by reference. Hydrosilation crosslinking may also be employed to crosslink the diene-containing rubbery elastomer.

When the diene containing elastomer is at least partially crosslinked, the degree of crosslinking may be measured by dissolution of the blend in a solvent for specified duration, and using certain calculations to compensate for the insoluble or resin portion and then calculate percent gel or unextractable rubber. The percent gel would normally increase with increasing crosslinking level. These techniques are well defined and established and are known to the persons that are skilled in this art. The percent gel content in the thermoplastic blends, more so in the thermoplastic vulcanizates (i.e. a thermoplastic elastomer with dynamically crosslinked elastomer) or TPVs may be anywhere in the range of about 5% to 100%.

When styrene-ethylene butylene-styrene (SEBS) triblock copolymers are used with the coupled diene elastomers, the weight average molecular weight of the SEBS as measured in size exclusion chromatography will preferably be greater than 100,000 g/mole, more particularly greater than 150,000 g/mole, and most preferably greater than 300,000 g/mole. Higher molecular weight is desired for achieving better sealing performance as measured by a low compression set and a higher retention of sealing force with time.

When the highly saturated elastomer is an olefinic elastomer for use with the uncoupled diene elastomer containing thermoplastic elastomer compositions, the olefinic elastomer may be selected from the group consisting of ethylene propylene diene rubber (EPDM), ethylene propylene copolymer rubber (EPR), ethylene-octene copolymer rubber, ethylene-hexene copolymer rubber, and the like. The olefinic elastomer may be crosslinked with either peroxide, phenolic, or hydrosilation curing or crosslinking systems. When the olefinic elastomer contains some diene units such as in EPDM, the phenolic or hydrosilation crosslinking may be employed. When there is no unsaturation present in the olefinic elastomer, peroxide crosslinking may be used. Such crosslinking technologies are known to those who are skilled in this art. The EPDM elastomer can be synthesized by solution polymerization or gas phase technologies. Metallocene catalyst systems may also be used. The olefic elastomer will preferably have a Mooney ML 1+4 viscosity at 125° C. that is greater than about 45.

Unsaturated rubbers useful to prepare thermoplastic elastomers according to the invention include monoolefin copolymer rubbers comprising non-polar, rubbery copolymers of two or more monoolefins (EPR rubber), preferably copolymerized with at least one polyene, usually a diene (EPDM rubber). EPDM is a polymer of ethylene, propylene and one or more non-conjugated diene(s), and the monomer components may be polymerized using Ziegler-Natta or metallocene catalyzed reactions, among others. Typically an EPDM rubber has from about 0.5 to about 6 or 10 weight percent of a diene (based on the weight of the polymer) and has a molar ratio of repeat units from ethylene to propylene of from 25:75 to 75:25. The olefinic elastomer to be used in the compositions with the diene solution elastomer may be available in a commercially available thermoplastic vulcanizate sold by Advanced Elastomer Systems or DSM or A. Schulman or the olefinic elastomer may be crosslinked simultaneously along with the uncoupled diene solution elastomer, in the presence of thermoplastic resin and oils.

This invention is illustrated by the following examples that are merely for the purpose of illustration and are not to be regarded as limiting the scope of the invention or the manner in which it can be practiced. Unless specifically indicated otherwise, parts and percentages are given by weight.

Table 1 lists the characterization of the solution SBRs that were used to prepare the masterbatch compositions that were subsequently used for preparing thermoplastic elastomers that are useful in sealing applications.

TABLE 1

Characterization of Solution SBR Used
in Making Crosslinked SBR Masterbatch

|  | SBR1 | SBR2 | SBR3 | SBR 4 |
|---|---|---|---|---|
| % Bound Styrene | 16 | 25.3 | 24.8 | 24.8 |
| % Vinyl Content | 42 | 51 | 14 | 14 |
| Polymer Coupling | $SnCl_4$ | — | — | — |
| Base Mooney Viscosity | 40 | 55 | 103 | 52 |
| Final Mooney Viscosity | 76 | 55 | 103 | 52 |
| Base Mw (g/mole) | 255,000 | 342,000 | 558,000 | 272,000 |
| Coupled Mw (g/mole) | 420,000 | — | — | — |
| Tg (° C.) Midpoint | −41 | −10 | −56 | −56 |

The SBR 1 is a coupled polymer that has been coupled with $SnCl_4$ during the polymerization process. SBR 3 and 4 are uncoupled polymers with differences in molecular weight. The weight average molecular weights (Mw) were measured by using Size Exclusion Chromatography and polystyrene standards were used for calibration.

In case of the coupled SBR, the molecular weight prior to coupling (base molecular weight) and after coupling (coupled molecular weight) were measured and are reported. Likewise, the Mooney Viscosity ML 1+4@ 100° C. was also measured before and after coupling for the coupled SBR, and are reported above. Glass Transition temperatures ($T_g$) were measured by Differential Scanning Calorimetry at heating rates of 10° C./minute.

Table 2 gives the composition of SBR masterbatches where SBR was dynamically vulcanized in a twin-screw extruder in presence of polypropylene resin and above and about the melting point of polypropylene. Dynamic vulcanization of the SBR was carried-out in a 25 mm co-rotating twin-screw extruder. Barrel temperatures of 180° C., and a screw speed of 300 RPM was employed in the extruder.

TABLE 2

Composition in % of Crosslinked SBR Masterbatches
Made by Dynamic Vulcanization

| No | 1 | 2 | 3 | 4 |
|---|---|---|---|---|
| SBR 1 | 59.35 | — | — | — |
| SBR 2 | — | 59.35 | — | — |
| SBR 3 | — | — | 59.35 | — |
| SBR 4 | — | — | — | 59.35 |
| Trigonox 101-45B-pd [a] | 0.92 | 0.92 | 0.92 | 0.92 |
| Talc [b] | 7.77 | 7.77 | 7.77 | 7.77 |
| Polypropylene [c] | 31.96 | 31.96 | 31.96 | 31.96 |
| Total | 100 | 100 | 100 | 100 |

[a] Peroxide crosslinking agent from Akzo Nobel
[b] Mistron Vapor R talc from Luzenac
[c] Isotactic homopolymer grade 3825, Melt Flow Rate 30 g/10 minutes @ 230° C./2.16 Kg, supplied by Atofina Table 3 lists the compositions of oil extended TPE formulations. Crosslinked SBR masterbatch of Examples 1, 2, 3, and 4 (herein called XL-SBR1, XL-SBR2, XL-SBR3 and XL-SBR4 respectively) were used and dry blended with an SEBS, Oil, and polypropylene copolymer containing concentrate to form compositions of Examples 6, 7, 8, and 9 respectively. The dry blends were molded by using a Battenfeld injection molding machine BA 800/315. The temperatures of 210/204/204/191° C. were used for the Nozzle/Forward/Middle/Rear zones to mold the test specimens. The composition of Example 5 (control) was prepared by separate additions of the individual components in a Coperion ZSK25 twin screw extruder with 8 barrels and 32 L/D. The throughput rate of 20 lb/hour, barrel temperatures of 180° C., and a screw speed of 300 RPM were employed. The compositions were injection molded as described above, and were tested for the physical properties.

TABLE 3

Oil Extended Soft TPE Compositions of SEBS and
Crosslinked SBR Masterbatch Additions with SEBS

| No | 5+ | 6 | 7 | 8 | 9 |
|---|---|---|---|---|---|
| XL-SBR 1 | — | 21.14 | — | — | — |
| XL-SBR 2 | — | — | 21.14 | — | — |
| XL-SBR 3 | — | — | — | 21.14 | — |
| XL-SBR 4 | — | — | — | — | 21.14 |
| Kraton G 1651 | 60.41 | 39.27 | 39.27 | 39.27 | 39.27 |
| Polypropylene (Atofina 3825, 30 MFI Isotactic Homopolymer) | 11.21 | 11.21 | 11.21 | 11.21 | 11.21 |
| Polypropylene (Atofina 7823 Mz Isotactic Copolymer 30 MFI) | 10.69 | 10.69 | 10.69 | 10.69 | 10.69 |

TABLE 3-continued

Oil Extended Soft TPE Compositions of SEBS and
Crosslinked SBR Masterbatch Additions with SEBS

| No | 5+ | 6 | 7 | 8 | 9 |
|---|---|---|---|---|---|
| Renoil 471 | 14.96 | 14.96 | 14.96 | 14.96 | 14.96 |
| Talc | 2.73 | 2.73 | 2.73 | 2.73 | 2.73 |
| Total | 100 | 100 | 100 | 100 | 100 |

+Control

The physical properties of the thermoplastic elastomer compositions were tested generally in accordance with the relevant ASTM test methods; Durometer hardness D 2240-00, tensile properties D 412-98 a method A, tear strength D624-00, flexural properties D 790-00, compression set D395-01 method B, and effect of liquids D471-98.

TABLE 4

Properties of Oil Extended Soft TPE Compositions of SEBS
and Crosslinked SBR Masterbatch Additions with SEBS

| No | 5+ | 6 | 7 | 8 | 9 |
|---|---|---|---|---|---|
| Shore A Hardness | 85 | 84 | 83 | 83 | 84 |
| Tensile Strength (Mpa) | 17.4 | 11.5 | 12.2 | 10.2 | 11.2 |
| Tear Strength (N/mm) | 51.3 | 40 | 40.2 | 41.8 | 41 |
| Flexural Modulus (Mpa) | 57.7 | 50.5 | 46.2 | 48.6 | 47 |
| % Compression Set B | | | | | |
| @ 23 C. | 23.5 | 20.2 | 19.7 | 21.4 | 20.2 |
| @ 70 C. | 67 | 43.5 | 41.3 | 43.7 | 43.5 |
| % Weight Gain IRM Oil 903 @ 70 C. | 67.5 | 50.3 | 49.2 | 53.8 | 56.6 |
| % Force Retention* | | | | | |
| Time t = 0 hours | 100 | 100 | 100 | 100 | 100 |
| Time t = 250 hours | 80 | 97 | 92 | 98 | 88 |
| Time t = 500 hours | 78 | 93 | 84 | 100 | 87 |

+Control
*Compressive Stress Relaxation, ISO 1183 test method, 23° C., 3.2 mm Ring Specimen Geometry, @ 25% Compression, % Force Retention = Force at Time t hours* 100/Force at Time 0 hours The crosslinked SBR and oil extended SEBS containing thermoplastic elastomers have better compression set and oil resistance than the SEBS control 5. Low compression set is desired for sealing applications. Furthermore, the force retention in a stress relaxation experiment is the very high for the TPE composition of Example 6 and Example 8 that contained crosslinked SBR1 (XL-SBR1) and crosslinked SBR 3 (XL-SBR3). Example 6 containing XL-SBR1 and Example 8 containing XL-SBR3 had very high retention of sealing force that is believed to be attributed to a very high molecular weight of the styrene-butadiene rubber. High retention of sealing force is also highly desirable for sealing applications. SBR1 is a high vinyl content SBR that was coupled with $SnCl_4$. Coupled polymers with a high molecular weight and high vinyl content provide excellent force retention in the a compressive stress relaxation experiment. SBR 3 is a low vinyl uncoupled SBR with the highest weight average molecular weight used. The TPE compositions of Example 8 have the best force retention with no significant reduction in the force retention values.

Better force retention may be further possible at higher proportions of crosslinked SBR in the blends with SEBS. Also, seals of lower shore A hardness can be obtained by lowering the thermoplastic resin content and/or increasing the oil content.

In the following examples, a commercially available thermoplastic vulcanizate that contains polypropylene, crosslinked EPDM and oil was dry blended with each of masterbatches of crosslinked SBRs namely XL-SBR1, XL-SBR3, and XL-SBR4. The crosslinked EPDM containing thermoplastic vulcanizate used was Santoprene® 201-55 of Shore A 55 from Advanced Elastomer Systems. Santoprene® 201-55 was blended with respective crosslinked SBR masterbatches in the weight ratio 52.5:47.5. The dry blends were physically mixed, homogenized and injection molded in an injection-molding machine to mold specimens. As a control, additional amount of polypropylene was added to Santoprene® 201-55 to increase the hardness values for comparison to the molded specimens of blends of Santoprene® 201-55 with crosslinked SBR masterbatches (Examples 11-13) that had higher amounts of polypropylene that was a part of the SBR masterbatches. The samples were prepared using a Battenfeld BA 800/315 injection-molding machine. The samples were molded by using zone temperatures of Nozzle/Forward/Middle/Rear of 205/199/199/193° C. respectively and an injection pressure of 20,000 $lbs/in^2$.

TABLE 5

Composition in Weight % for Preparing Thermoplastic Vulcanizes
for TPE Containing Crosslinked EPDM and Crosslinked SBR

| | 10+ | 11 | 12 | 13 |
|---|---|---|---|---|
| Santoprene ® 201-55 | 84.8 | 52.5 | 52.5 | 52.5 |
| Homopolymer Polypropylene (Atofina 3825, 30 Melt Flow Index) | 18.2 | — | — | — |
| XL-SBR1 | — | 47.5 | — | — |
| XL-SBR3 | — | — | 47.5 | — |
| XL-SBR4 | — | — | — | 47.5 |
| Total | 100 | 100 | 100 | 100 |

+Control

TABLE 6

Properties of TPE Containing Crosslinked EPDM
and Crosslinked SBR Prepared in Table 5

| No | 10+ | 11 | 12 | 13 |
|---|---|---|---|---|
| Shore A Hardness | 82 | 84 | 82 | 85 |
| Tensile Strength (Mpa) | 7.2 | 6.9 | 6 | 6.4 |
| Tear Strength (N/mm) | 32 | 23 | 27.4 | 27 |
| Flexural Modulus (Mpa) | 83 | 82 | 88 | 71 |
| % Compression Set B | | | | |
| @ 23 C. | 24 | 20 | 21.2 | 20 |
| @ 70 C. | 39.3 | 36.7 | 32.5 | 36 |
| % Weight Gain IRM Oil 903 @ 70 C. | 44 | 36 | 42 | 43 |
| % Force Retention* | | | | |
| Time t = 0 hours | 100 | 100 | 100 | 100 |
| Time t = 24 hours | 74 | 89 | 73 | 84 |
| Time t = 72 hours | 59 | 84 | 72 | 64 |

+Control

Examples 11-13 that contained both crosslinked EPDM and crosslinked SBR have the lowest compression set. This indicates the improvement in the sealing performance of the elastomer composition that is observed when crosslinked SBR is present in thermoplastic vulcanizates that contain crosslinked EPDM. Low compression set is desirable for many seals. Also, the % Force retention in a stress relaxation experiment is very high for Examples 11, 12, and 13, indicating the ability of the crosslinked SBR with proper selection of vinyl content, styrene content, coupling, and molecular weight to maintain a high level of sealing force during the life of a seal. Higher force retention is desired for the sealing. Particularly, Example 11 that contained a $SnCl_4$ coupled crosslinked SBR with a high vinyl content and a high molecular weight has the highest level of sealing force maintained at the end of the test period.

The ratio of crosslinked SBR to crosslinked EPDM may be varied from 20:80 to 80:20. It is possible to separately crosslink SBR and EPDM in presence of an olefin resin and then blend them together for making seals or molded parts. It is also possible to crosslink either SBR or EPDM simultaneously in one process step in presence of polyolefin resin, and processing oil.

The seals prepared with the thermoplastic elastomer containing crosslinked solution diene rubber may be used in the construction, electrical, industrial, automotive, fluid delivery, dynamic seals, and appliances. Some examples of the applications are the seals for residential windows, architectural windows, storefronts, entrances, atriums, skylights, roof windows, greenhouses, carports, sloped glazing, curtainwall and high-rises, glazing gaskets, glazing seals, rainscreens, secondary seals, primary seals, doorsweeps, door seals, rail pads, rail boots, rail flanges, building, architectural, highway bridge and expansion joints, geomembranes, bridge bearing pads, and architectural bearing pads. Examples of some of the applications where the thermoplastic elastomer compositions can be used are; electrical connectors, seals for electrical enclosures, grommets, gaskets, splice seals, terminators, boots, plugs cables, jackets, wires, cord seals, grommets and gaskets for industrial equipment, food processing equipment, and manufacturing equipment may be used with the thermoplastic elastomer. In automotive, the belts, hoses, covers, sockets, mounts, dampers, weatherseals, doorseals, trunklid seals, windshield gaskets, static and dynamic seals, constant velocity joint (CVJ) boots, rack and pinion boots, miscellaneous automotive boots may be prepared with the said thermoplastic elastomer. In fluid delivery applications, the thermoplastic elastomer containing crosslinked diene elastomer may be used in pipe seals, pipe connectors, irrigation delivery seals, culvert seals, and pipe couplings. For dynamic applications, the cartwheels, castors, tires, boots, bellows, hose connectors may be prepared with the thermoplastic elastomer.

While certain representative embodiments and details have been shown for the purpose of illustrating the subject invention, it will be apparent to those skilled in this art that various changes and modifications can be made therein without departing from the scope of the subject invention.

What is claimed is:

1. A gasket which is comprised of a dynamically vulcanized blend in the form of an O-ring wherein the dynamically vulcanized blend is comprised of a polymeric composition which is comprised of a blend of (A) a thermoplastic resin selected from the group consisting of polypropylene, polyethylene, poly phenylene ether, polystyrene, and styrene containing copolymer resins, (B) an elastomeric polymer selected from the group consisting of block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, and a crosslinked olefinic elastomer, (C) a high molecular weight crosslinked diene elastomer comprised of repeat units that are derived from conjugated diene monomer selected from the group consisting of 1,3-butadiene and isoprene, wherein the high molecular weight diene elastomer has a weight average molecular weight of at least about 200,000, and (D) an oil.

2. A gasket as specified in claim 1 wherein the thermoplastic resin is present at a level which is within the range of about 5 parts by weight to 60 parts by weight, wherein the elastomeric polymer is present at a level which is within the range of 5 parts by weight to about 90 parts by weight, wherein the high molecular weight crosslinked diene elastomer is present at a level which is within the range of about 5 parts by weight to about 90 parts by weight, and wherein the oil is present at a level which is within the range of about 15 parts by weight to about 600 parts by weight.

3. A gasket as specified in claim 2 wherein the high molecular weight crosslinked diene elastomer is dynamically crosslinked during a thermo-mechanical mixing step in the presence of the thermoplastic resin.

4. A gasket as specified in claim 2 wherein the thermoplastic resin is selected from the group consisting of polypropylene, polyethylene, polyphenylene ether, and polystyrene.

5. A gasket as specified in claim 2 wherein the thermoplastic resin is a styrene containing copolymer resin.

6. A gasket as specified in claim 2 wherein an elastomeric polymer is a block copolymer comprising a first polymeric block that is comprised of repeat units that are derived from a vinyl aromatic monomer and a second block that is comprised of repeat units that are derived from a conjugated diolefin monomer, wherein at least about 90% of the repeat units in the second block are hydrogenated.

7. A gasket as specified in claim 6 wherein the block copolymer is selected from the group consisting of styrene-ethylene, butylene-styrene block copolymers, styrene-ethylene, propylene-styrene block copolymers, styrene-ethylene, propylene block copolymers, styrene-ethylene, ethylene propylene-styrene block copolymers, partially hydrogenated products of styrene-isoprene, butadiene-styrene block copolymers, styrene-butadiene-styrene block copolymers, and styrene-isoprene-styrene block copolymers.

8. A gasket as specified in claim 6 wherein the block copolymer is a styrene-ethylene, butylene-styrene triblock polymer, wherein the ethylene, butylene block is obtained by the hydrogenation of a butadiene mid block with a vinyl content of no less than 30 percent by weight.

9. A gasket as specified in claim 6 wherein the block copolymer has a weight average molecular weight of at least 100,000.

10. A gasket as specified in claim 6 wherein the block copolymer has a weight average molecular weight of at least 150,000.

11. A gasket as specified in claim 2 wherein the a high molecular weight crosslinked diene elastomer is a styrene-butadiene rubber having a bound styrene content that is within the range of 5% to 40% by weight and a vinyl content that is within the range of about 5% to 80% by weight, and wherein the high molecular weight diene elastomer has a weight average molecular weight of at least about 275,000.

12. A gasket as specified in claim 2 wherein the a high molecular weight crosslinked diene elastomer is comprised of repeat units that are derived from 1,3-butadiene, isoprene, and optionally, a vinyl aromatic monomer, wherein the repeat units in the crosslinkable elastomer are distributed in a random manner, wherein the crosslinkable elastomer is coupled with a tin (Sn) coupling agent or a silicon (Si) coupling agent, and wherein the high molecular weight diene elastomer has a weight average molecular weight of at least about 275,000.

13. A gasket as specified in claim 2 wherein the high molecular weight diene elastomer has a weight average molecular weight of at least about 375,000.

14. A gasket as specified in claim 2 wherein the high molecular weight diene elastomer is selected from the group consisting of nitrile rubbers and hydrogenated nitrile rubbers.

15. A gasket as specified in claim 2 wherein the elastomeric polymer is a crosslinked olefinic elastomer wherein the olefin elastomer is a polyolefin copolymeric elastomer having repeat units that are derived from at least 2 members selected from the group consisting of ethylene, propylene, butene, hexene, and octane, and wherein the crosslinked olefinic elastomer has a Mooney ML 1+4 viscosity at 125° C. of at least about 45.

16. A gasket as specified in claim 15 wherein the polyolefin copolymer elastomer is an ethylene-propylene-diene elastomer.

17. A gasket as specified in claim 2 wherein the oil is an extender oil selected from the group consisting of paraffinic oils, naphthenic oils, and polybutene.

* * * * *